(12) United States Patent
Buenrostro (10) Patent No.: US 9,893,973 B2
(45) Date of Patent: Feb. 13, 2018

(54) REAL-TIME, LOW MEMORY ESTIMATION OF UNIQUE CLIENT COMPUTERS COMMUNICATING WITH A SERVER COMPUTER

(71) Applicant: Ooyala, Inc., Santa Clara, CA (US)

(72) Inventor: Issac Buenrostro, Sunnyvale, CA (US)

(73) Assignee: Ooyala, Inc., San Jose, CA (US)

( * ) Notice: Subject to any disclaimer, the term of this patent is extended or adjusted under 35 U.S.C. 154(b) by 325 days.

(21) Appl. No.: 14/854,924

(22) Filed: Sep. 15, 2015

(65) Prior Publication Data

US 2016/0080239 A1    Mar. 17, 2016

Related U.S. Application Data

(60) Provisional application No. 62/050,684, filed on Sep. 15, 2014, provisional application No. 62/191,977, filed on Jul. 13, 2015.

(51) Int. Cl.
*H04L 12/26* (2006.01)
*H04L 29/08* (2006.01)

(52) U.S. Cl.
CPC .......... *H04L 43/10* (2013.01); *H04L 43/0811* (2013.01); *H04L 43/106* (2013.01); *H04L 43/16* (2013.01); *H04L 67/145* (2013.01)

(58) Field of Classification Search
CPC ..... H04L 43/10; H04L 43/16; H04L 43/0811; H04L 43/106; H04L 67/145
See application file for complete search history.

(56) References Cited

U.S. PATENT DOCUMENTS

| | | | |
|---|---|---|---|
| 6,363,495 B1* | 3/2002 | MacKenzie | G06F 11/1482 714/37 |
| 6,789,110 B1* | 9/2004 | Short | H04L 12/14 709/221 |
| 7,464,378 B1* | 12/2008 | Limaye | G06F 9/5061 714/100 |
| 9,740,293 B2* | 8/2017 | Kramer | G06F 3/017 |
| 2007/0140193 A1 | 6/2007 | Dosa | |

(Continued)

OTHER PUBLICATIONS

European Patent Office, "Search Report" in application No. PCT/US2015/050273, dated Dec. 8, 2015, 14 pages.

(Continued)

*Primary Examiner* — Kostas Katsikis
(74) *Attorney, Agent, or Firm* — Hickman Palermo Becker Bingham LLP (57) ABSTRACT

Computer systems and methods for estimating the number of client computers actively coupled to a server computer system in real-time are discussed herein. Specifically, systems and methods are discussed for a server computer system receiving heartbeat messages from a plurality of client computers and generating an estimate of the number of client computers actively coupled to the server computer system in real-time without locks, such as a database table lock. A heartbeat message from a client computer need not include a client or user identifier. In an embodiment, the memory footprint/overhead is O(1), and may be a single whole number greater than zero, such as a 64-bit unsigned integer. Systems and methods are also discussed herein to calculate and reduce the expected error of the estimated number of active clients.

22 Claims, 4 Drawing Sheets

(56) References Cited

U.S. PATENT DOCUMENTS

| | | | |
|---|---|---|---|
| 2010/0149996 A1* | 6/2010 | Sun | H04L 29/12292 370/244 |
| 2011/0149720 A1* | 6/2011 | Phuah | H04L 12/2697 370/216 |
| 2012/0044955 A1 | 2/2012 | Chandrasekaran | |
| 2015/0077326 A1* | 3/2015 | Kramer | G06F 3/0325 345/156 |
| 2016/0066200 A1* | 3/2016 | Dayanandan | H04W 72/0453 370/252 |

OTHER PUBLICATIONS

European Claims in application No. PCT/US2015/050273, dated Dec. 2015, 9 pages.

\* cited by examiner

REAL-TIME, LOW MEMORY ESTIMATION OF UNIQUE CLIENT COMPUTERS COMMUNICATING WITH A SERVER COMPUTER

CROSS-REFERENCE TO RELATED APPLICATIONS; BENEFIT CLAIM

This application claims the benefit of U.S. Provisional Application No. 62/050,684, filed Sep. 15, 2014, and U.S. Provisional Application No. 62/191,977, filed Jul. 13, 2015. Both provisional applications are incorporated by reference herein.

FIELD OF THE INVENTION

The present invention generally relates to server-side analytics and more specifically to determining the number client computers that are actively transferring data with one or more server computers. SUGGESTED GROUP ART UNIT: 2447 (ELECTRICAL COMPUTERS AND DIGITAL PROCESSING SYSTEMS: MULTICOMPUTER DATA TRANSFERRING); SUGGESTED CLASSIFICATION: 709.

BACKGROUND

A website analytics system can collect telemetry data for a website. The telemetry data may identify which webpages or other content have been requested or downloaded and by which client computers. For example, a website analytics system can generate various statistics about a website, such as the number of times a particular webpage of the website was served, the number of unique visitors the website received each day over the past month, where the visitors of were geographically located, or what browser each client computer was using. Website administrators may use the statistics to gauge how much advertisers should pay per impression, determine which web pages are most popular, or determine what types of client devices are requesting data or webpages. Website administrators may also use the statistics to determine how to allocate resources, such as hardware or developer time. For example, if the server computers for a website are taking more than a particular amount of time to serve a particular number of webpage impressions, then a website administrator may instantiate additional server computers to reduce the amount of time the website takes serve the same number of webpage impressions.

A website analytics system may generate and receive large amounts of telemetry data for a website. Due, at least in part, to the volume of information generated, the website analytics system may take a long time to process the telemetry data to generate one or more statistics. Accordingly, a website analytics system may dedicate a first set of computers or processes to receive and store telemetry data, and a second set of computers or processes to generate one or more statistics from the telemetry data "offline". Generating a statistic offline means generating the statistic after the telemetry data used to generate the statistic is received, aggregated or combined with other telemetry data, and stored in persistent storage for subsequently requested reports. In contrast, generating a statistic in "real-time" means generating the statistic while the telemetry data affecting the statistic is being received, or shortly thereafter.

Some statistics may be more useful if generated and acted upon in real-time rather than offline. For purposes of illustrating a clear example, assume a website comprises a set of server computers in a cloud computing infrastructure, where the set of server computers are configured to support up to 100 different active client computers concurrently streaming video. Assume further that the website administrator may allocate or deallocate cloud resources to the website at will. If more than 100 client computers are actively trying to stream video from the website, then the website may be overwhelmed and the client computers may have intermittent pausing or longer than expected downloading times. The website administrator may not realize the current number of server computers allocated to streaming video is insufficient until users begin to complain or a latent offline statistic or report is generated. In contrast, if a website administrator could determine in real-time how many client devices are currently streaming video, then the website administrator could allocate or deallocate resources, such as cloud server computers, as needed. However, determining a statistic, such as how many client devices are active or currently downloading video, may be difficult.

One way to determine how many client devices are actively communicating with a webserver is to maintain a database table of active devices comprising device identifiers that identify which devices have requested data within a particular amount of time. For example, each time a client computer requests data from a server computer, a tracker process may store an identifier of the client computer and a current timestamp in a record of the database table. An identifier may be the IP address or MAC address of the client computer or a username of a user using the client computer. If a request is received from an identifier already in a record in the database table, then the tracker process update the timestamp in the record to correspond to the current time. One or more reaper processes may periodically review the list of addresses and remove addresses from the table that do not have a timestamp that corresponds to a time that is within a particular range of the current time. One or more aggregation processes may periodically count the number of addresses are currently in the database table to determine how many client computers are connected to the webserver. The one or more aggregation processes may store the counts in a database for future reports generated offline.

A system that implements the method discussed above can require a massive amount of computational and engineering resources. For example, to make sure a one process, such as a tracker process, does not try to add or update an entry, while a second process, such as a reaper process or aggregation process, scans or deletes an entry from the database, the database may impose locks on the database table. Locking may quickly slow down performance of the database to the point where the aggregation processes are no longer accurately counting how many clients are actively communicating with the webserver. Accordingly, a website may maintain the database table as one or more shards distributed across one or more database server computers, which may allow a process to lock a shard or row in the share without locking the portions of the table in other shards. The website may maintain a large number of web server computers coupled to the database servers to serve content and make database requests to update the database table when content is requested by each client computer. The website may maintain one or more computers and/or processes to maintain coherency and/or execute the reaper processes and/or the aggregation processes.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

While each of the drawing figures illustrates a particular embodiment for purposes of illustrating a clear example, other embodiments may omit, add to, reorder, and/or modify any of the elements shown in the drawing figures. For purposes of illustrating clear examples, one or more figures may be described with reference to one or more other figures, but using the particular arrangement illustrated in the one or more other figures is not required in other embodiments.

TERMS, MEANINGS, AND EXAMPLES

For purposes of illustrating clear examples of the subject matter discussed in this disclosure, one or more meanings or examples may be associated with one or more terms throughout this disclosure. However, each meaning or example associated with each term is not meant to be exclusive. Furthermore, words, such as "or" may be inclusive or exclusive unless expressly stated otherwise. The following is a non-exclusive list of meanings and examples of particular terms used throughout this disclosure, one or more terms in the following list may be associate with one or more additional meanings or examples later discussed herein.

A "computer" may be one or more physical computers, virtual computers, and/or computing devices. As an example, a computer may be one or more desktop computers, laptop computers, mobile devices, cloud-based computers, and cloud-based cluster of computers, virtual computer instances or virtual computer elements such as virtual processors, storage and memory, and/or any other special-purpose computing devices. Any reference to "a computer" herein may mean one or more computers, unless expressly stated otherwise.

A "server computer" may be a computer that receives, processes, and/or responds to one or more requests from one or more client computers.

A "client" or "client computer" may be a computer, or a process running on a computer, that the requests data from, or sends data to, a server computer.

A "server computer system" may be a computer system comprising one or more computers that receive, process, and respond to requests from one or more client computers. For example, a website, cloud computing system, or content delivery network may be a server computer system. Computers in a server computer system may work in concert to receive, process, and respond to requests from a client computer.

A client is an "active client" or "actively coupled to" a server computer system while the client and server computer system are communicating with each other. For example, a client computer may be actively coupled to a server computer system while the client computer sends one or more requests for data, receives the requested data, or sends one or more heartbeat messages. A client need not be persistently connected to a server computer system for the client computer to be actively coupled to the server computer system. A client computer may be actively coupled to a server computer system while the client computer is intermittently requesting or receiving related data from a server computer system. Data may be related if the data is requested from the same server computer system, or part of a whole. For example, if a movie is divided and stored in five separate files or if the five separate files are stored on the server computer system, then the five files are related. Accordingly, a client computer may be continuously and actively coupled to the server computer system while the client computer sends a separate request for each of the five files and downloads each of the five files separately or concurrently.

A "session" is a period of time that a client computer is actively coupled to a server computer system. For example, a session may begin and end when a continuous connection between a client computer and a server computer system begins and ends, respectively. Also, for example, a session may begin when a client computer, or a web browser running on a client computer, sends a first request for a web page from a server computer system; throughout the session the client computer may send one or more additional requests for one or more supporting assets referenced in the web page, such as images, media, JavaScript, stylesheets; and, the session may end when the client computer receives the web page and the one or more supporting assets to present the web page to a user or when all connections between the client computer and the server computer system over a particular protocol are terminated. Also for example, a session may begin when a client computer begins streaming, or requesting a portion of, a media title such as a movie, audiobook, or video presentation; the session may end when the client computer finishes streaming the media title, no longer requests any additional portion of the media title, or stops presenting the media title.

An "administrator" is a user that can receives, queries for, or modifies the state of a server computer system. The particular role of a user is not critical and the label "administrator" is used here merely for convenience to illustrate a clear example.

The notation <J, K> herein describes a list or vector of values. In the example <J, K>, the vector has two values, and J represents the first value in the vector and K represents the second value in the vector. Elements may be separated by spaces, commas, or any other character(s) to increase the ability to read and understand the description.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein to allow a server computer system to estimate the number of clients actively coupled to the server computer system in real-time, without locks, without client or user identifiers, with lower memory footprint/overhead (O(l)) memory) and a lower computer processor load than other techniques. Real-time may mean within a particular window of time or soon after receiving data and/or determining results. Techniques are also discussed herein to calculate and reduce the expected error of the estimated number of active clients.

A server computer system may use the following equation to estimate the number of connections a server computer system has open (i.e., the number of clients that are actively coupled to the server computer system):

$$C \approx \frac{\sum_{t-w < m \cdot timestamp \leq t} m \cdot delta}{w}$$

In the above equation, C is the estimated number of connections as of a current time t, over a particular amount of time ("window") w; the values w and delta in the equation have the same units of time, such as seconds or milliseconds. "m" represents a "heartbeat message" (discussed in further herein) that is associated with two values: a timestamp and a delta value. A server computer system may estimate the total number of client computers that are actively coupled to the server computer system at a particular time t by summing delta values associated with heartbeat messages that are associated with a timestamp within a particular amount of time w from the particular time t and dividing the sum by the amount of time in the window w. The sum of the delta values associated with heartbeat messages in a particular period of time, such as a window, may be referred to herein as a total delta value.

In the above equation, a client identifier is not used. The same client computer may send one or more heartbeat messages. However, the heartbeat messages need not include a client identifier. Furthermore, a server computer system that receives the heartbeat messages need not attribute or associate the heartbeat messages with a particular client or user.

Although the above equation implies that heartbeat messages may be archived or stored in persistent memory and later aggregated offline, one or more of the embodiments discussed herein illustrate how to compute an estimated number of active client computers in real-time using data in volatile, non-persistent memory, without archiving heartbeat messages or waiting for an asynchronous, offline process to be executed using data or heartbeat messages archived or stored in persistent memory. The estimated number of active client computers coupled to a server computer system may be computed using a distributed computing system. Furthermore, the estimated number of active client computers may be computed and emitted periodically throughout a widow, not just at the boundary of sequential contiguous windows.

Heartbeat Messages

A heartbeat message is a message a client computer sends to a server computer system that indicates, or is associated with, an amount of time since the client computer sent the last heartbeat message to the server computer system during a particular session. The amount of time indicated, or associated with, a heartbeat message is referred to as a "delta value". The delta value may be represented in different ways. For example, a delta value may be a numerical value, such as an integer or floating point value, which represents a particular number of milliseconds, seconds, minutes, or any other unit of time, since the client computer last sent a heartbeat message to the server computer system during a particular session. If the client computer is beginning a session with a server computer system (i.e., just starting to be actively coupled to the server computer system), then the first delta value in the first heartbeat message of the session may be zero. If the delta value is 500, then the delta value may indicate that 500 milliseconds have passed since the client computer sent the previous heartbeat in the current session or the session started 500 milliseconds ago.

In an embodiment, a heartbeat message may include a value from which the delta value may be derived. For example, a heartbeat message may include a timestamp that corresponds to a time at which the last heartbeat message was sent by the client computer to the server computer system during a current session or the beginning of the current session. The server computer system may determine the delta value for the heartbeat message by determining the amount of time that has elapsed from the time that the timestamp corresponds to, and the current time.

In an embodiment, heartbeat messages are sent at a particular frequency or predefined interval. Accordingly, the heartbeat message need not include a delta value, timestamp, or any other payload. The server computer system may assume that the delta value is the span of the predefined interval. The server computer system may modify the predefined interval by sending data to one or more client computers that instructs the client computers to send heartbeat messages at a modified frequency or interval. Accordingly, the server computer system may assume that the delta value for each heartbeat is the modified interval.

A heartbeat message may comprise data included in one or more data packets sent electronically using one or more network protocols, such as User Datagram Protocol, Transmission Control Protocol/Internet Protocol, HyperText Transfer Protocol, or any other standard or proprietary computer networking protocol. A heartbeat message may also include on or more attributes discussed further herein. A heartbeat message may include the delta value or one or more attributes in binary, plain text, structured data format (such as HTML or JSON), or any other standard or proprietary format or encoding.

A server computer system may associate, or add data to, a heartbeat message that corresponds to a time that the heartbeat message was received from a client computer. For example, when a server computer system receives a heartbeat message from a client computer, the server computer system may associate a timestamp to the heartbeat message, wherein the timestamp indicates, or corresponds to, the time that the heartbeat message was received or processed by the server computer system. A server computer can use the timestamp to determine the heartbeat message belongs to a particular window or sub-window (discussed further herein). In an embodiment, a client computer may include a timestamp in the heartbeat message, wherein the timestamp indicates, or corresponds to, the time the client computer sent the heartbeat message.

Heartbeat messages may include additional data to specify one or more classifications or groupings. For example, a heartbeat message may include data indicating one or more attributes, such as the geographic region the client resides, the type of client computer sent the heartbeat, the service the client is using, the data or type of data the client is requesting. For example, a heartbeat message may include attributes such as "web page", "image", "audio", "video", or the name of a particular webpage, image, audio book, movie, asset, or dataset.

Example Network Topology

Figure 1:
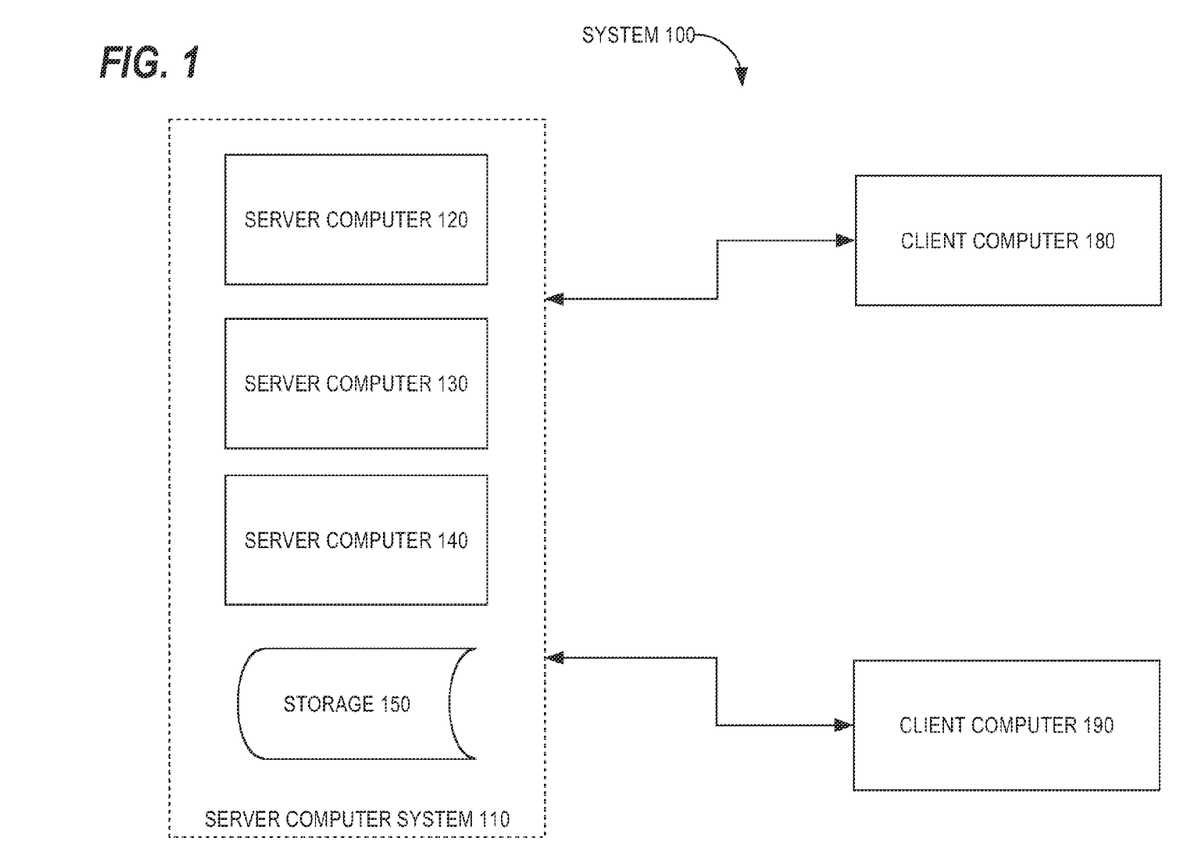
FIG. 1 illustrates a network topology for determining the number of client computers currently connected to one or more server computers in real-time in an example embodiment.

FIG. 1 illustrates a network topology for determining the number of client computers currently connected to one or more server computers in real-time in an example embodiment. In FIG. 1, system 100 comprises server computer system 110, client computer 180 and client computer 190 communicatively coupled over one or more computer networks.

Client Computers

Client computer 180 and client computer 190 are client computers operably coupled to server computer system 110. For purposes of illustrating a clear example, only two client computers, each of which are illustrated as having a single connection to server computer system 110, are included in system 100; however, any number of client computers may be actively coupled to server computer system 110 intermittently or at the same time. Furthermore, a client computer, such as client computer 180, may maintain more than one concurrent active coupling to server computer system 110.

A client computer may determine when a session begins and ends based on what the client is configured to do. For purposes of illustrating a clear example, assume a client application running on a client computer is a video player that downloads and presents media titles, such as a movies or audiobooks, from a server computer system. The client may determine that a session begins when the client begins downloading, streaming, or requesting at least a portion of the media title selected by a user. The client computer may determine that the session ends when the client computer finishes streaming or downloading the media title from the server computer system, no longer requests any additional portion of the media title from the server computer system, or stops presenting the media title to a user via a display or speakers.

A client may determine a delta value, i.e., how much time has passed since the beginning of a current session or how much time has passed since a previously sent heartbeat. In an embodiment, a client may determine a delta value by maintaining a single value, such as an unsigned or 64-bit integer. For example, a client computer may maintain a starting timestamp value represented as an unsigned 64-bit integer that indicates the number of milliseconds since epoch that the client started a current session or sent a previous heartbeat message in the current session. The client computer may determine how much time has passed since the beginning of the current session by generating a current timestamp value represented as another unsigned 64-bit integer that indicates the number of milliseconds since epoch, and subtracting the starting timestamp value from the current timestamp value. The client may replace the starting timestamp with the current timestamp value.

A client can send heartbeat messages to a server computer system at random times during a session, at regular intervals during a session, or as instructed by the server computer system. For example, a client computer may have a callback method that is called periodically according to a frequency stored locally or received from a client computer system. Each time the callback method is called, the client computer determines a delta value, sets the starting timestamp to be the current timestamp, and sends the delta value to the server computer system. Also for example, a client computer may have a heartbeat method that is called each time data is requested from a server computer system. Each time the heartbeat method is called, the client computer determines a delta value, updates the starting timestamp to be the current timestamp, and sends a heartbeat message with the delta value to the server computer system.

The server computer system may send data to the client computer that indicates when the client computer should send future heartbeats. For example, a server computer system may send data to a client computer that indicates the frequency at which the client should send heartbeat messages.

A heartbeat protocol defines when a session begins and ends or when to a client should send heartbeat messages. As discussed above, a client or a server computer system may define the parameters of a heartbeat protocol, i.e., when a session begins and ends or when a client should send heartbeat messages. A client computer, such as client computer 180, may execute two or more client processes concurrently, such as a web browser and a video player, each of which may be downloading web pages or video from, and actively coupled to, server computer system 110 or another server computer system concurrently. Each of the client processes may send heartbeat messages to the same or different server computer systems according to different heartbeat protocols. Accordingly, each heartbeat protocol may define when a session begins and ends differently than, or independently from, another heartbeat protocol; and, each heartbeat protocol may define when heartbeat messages are sent differently than, or independently from, another heartbeat protocol.

Server Computer System

Server computer system 110 comprises three server computers and a storage system operably coupled together: server computer 120, server computer 130, server computer 140, and storage 150. In other embodiments, server computer system 110 may include one or more computers distributed over one or more computer network or geographic regions.

Server computer system 110 estimates how many clients are actively coupled to server computer system 110. Server computer system 110 may also compute the expected error of the estimation, discussed further herein. Server computer system 110 may send new heartbeat protocol parameters to active clients indicating that clients should send heartbeat messages more or less frequently, which reduces or increases the expected error, respectively, as discussed further herein. Server computer system 110 may send new heartbeat protocol parameters to active clients in response to input from a network administrator or various load metrics of server computer system 110, such as available bandwidth, observed latency, or any other computer-based load metric.

Server computer system determines when a window or sub-window (discussed further herein) begins and ends or the amount of time each window or sub-window spans. For example, an administrator may store data in storage 150 that indicates a window begins and ends every second, and each window spans a single second. Accordingly, for each second, server computer system 110 sets a total delta value to zero; for each heartbeat message received during the one-second window, the server computer system 110 adds the delta value associated with the heartbeat message to the total delta value; and at the end of the window, the server computer system 110 estimates the number of clients actively coupled to the server computer system based on the total delta value and emits the estimate.

Storage 150 may be volatile or persistent storage. Clients, such as client computer 180 and client computer 190, may request data from storage 150, such as a particular frequency over which clients should send heartbeat messages. Storage 150 may store one or more configurations that indicate the parameters over which server computer system 110 or clients should operate. For example, storage 150 may include data that indicates the following:

A window should be 3000 milliseconds;
The estimated number of active clients should be bound to a minimum expected error threshold;
The estimated number of active clients should be bound to a maximum expected error threshold;
Server computer 120 is the master server computer (a computer configured to combine the data from other server computers to estimate the total number of client actively coupled to a server computer system);
Where results of each window should be stored on storage 150; and
Whether a result is sent to a remote client computer operated by an administrator of server computer system 110.

Storage 150 may be shared memory or distributed memory that is operably coupled to each of the one or more computers in server computer system 110. Storage 150 may be included in a computer, such as server computer 120, or a different computer not illustrated in system 100.

While some of the components listed above are illustrated as if running on a separate or remote computer from each another computer, at least some of the components listed above may be part of, or executed on, the same computer. For example, server computer 120, server computer 130 server computer 140 and storage 150 may be components or processes executed on the same single, physical computer. Also for example, server computer 120 and storage 150 may be part of the same computer and may be operably coupled to other server computers in server computer system 110, such as server computer 130 and server computer 140.

Figure 2:
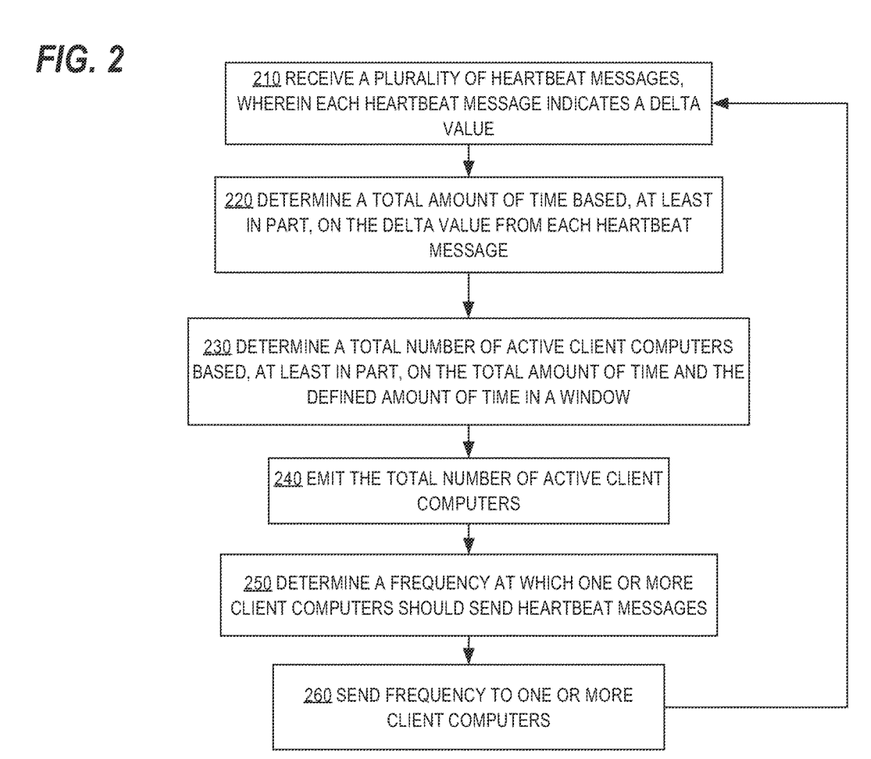
FIG. 2 illustrates a process for determining the number of client computer connected to one or more server computers in real-time in an example embodiment.

Example Process for Estimating the Number of Clients Actively Coupled to a Server Computer System FIG. 2 illustrates a process for estimating the number of client computers actively coupled to a server computer system in real-time in an example embodiment. The steps in FIG. 2 are not based on a client identifier; accordingly a heartbeat message need not include a client identifier. Although, the same client computer may send one or more heartbeat messages, the heartbeat messages need not include a client or user identifier. Furthermore, a server computer system that receives the heartbeat messages need not attribute or associate the heartbeat messages with a particular client or user. In an embodiment, a heartbeat message can include a client or user identifier as an attribute or for purposes of classification discussed further herein.

In step 210, a server computer system receives a plurality of heartbeat messages wherein each heartbeat message indicates a delta value. For example, client computer 180, client computer 190, and one or more other clients may each send a heartbeat message to server computer 120. Each heartbeat message is associated with a delta value. For example, each heartbeat message may include or imply a delta value as discussed herein.

In step 220, server computer 120 determines a total amount of time based, at least in part, on the delta value from each heartbeat message. There are many ways to determine the total amount of time. For purposes of illustrating a clear example, assume server computer 120 receives the plurality of heartbeat messages associated with a particular window. Server computer 120 sets a total delta value associated with the particular window to zero; and, for each heartbeat message, server computer 120 adds the delta value associated with the heartbeat message to the total delta value.

While step 210 and 220 are illustrated as if sequential steps, these steps may be executed, at least in part, concurrently. For example, at the beginning of a window, server computer 120 may set a total delta value to zero. As server computer 120 receives or processes heartbeat messages from client computer 180, client computer 190, or one or more other clients during the window, server computer 120 adds the delta value associated with each heartbeat message to the total delta value. For purposes of illustrating a clear example, assume server computer 120 received 10,000 heartbeat messages, each of which is associated with a four-second delta value. As server computer receives or processes each heartbeat message of the 10,000 heartbeat messages, server computer 120 adds four seconds to a total delta value. Accordingly, after server computer 120 processes the last heartbeat of the 10,000 heartbeat messages, server computer 120 has calculated the total delta value to be 40,000 seconds.

In step 230, the server computer system determines a total number of active client computers based, at least in part on the total amount of time and the defined amount of time in a window. For purposes of illustrating a clear example, assume a window spans two seconds, and, at the end of the window, the total delta value associated with the window is 40,000. Server computer 120 divides 40,000 by 2, which generates an estimate of 20,000 clients actively coupled to server computer system 110.

Emitting an Estimated Number of Active Clients

In step 240, the server computer system emits the total number of active client computers coupled to the server computer system. Emitting an estimate means electronically sending the estimate to another server computer, caching the estimate, storing the estimate in a persistent data store, or responding to the estimate with one or more actions. For example, server computer 120 may send the estimated number of active clients to a computer, such as a phone or desktop computer, used by the administrator of server computer system 110. Additionally or alternatively, server computer 120 may store the estimated number of active clients coupled to server computer system 110 for a particular window along with data that identifies, or associates the estimated number with, the particular window in storage 150. An administrator may use a computer, such as client computer 190 or another computer not illustrated in FIG. 1, but operably coupled to server computer system 110, to query for the estimated number of clients actively coupled to server computer system 110 over a period of time that includes at least the particular window. In response, storage 150 may send the estimate number of active clients for the particular window to the administrator's computer for visualization and/or other user.

Modifying the Capacity or Behavior of the Server Computer System or One or More Clients A server computer system may perform one or more actions that modify the capacity or behavior of the server computer system or one or more clients based on, or in response to, one or more estimated numbers of active client computers. For purposes of illustrating a clear example, assume the following:

Server computer system 110 is part of an elastic cloud computing system;
Server computer system 110 is configured to support up to 1,000 active clients streaming video content;
A maximum active client threshold is set to 1,000;
A minimum active client threshold is set to 800;
A duration threshold is less than or equal to the amount of time from the beginning of the first window and the end of the third window;
The first most recent emitted estimate of active clients is 1,010;
The second most recent emitted estimate of active clients is 1,022; and
The third most recent emitted estimate of active clients is 1,052.

Server computer 120 compares the maximum active client threshold and the minimum active client threshold to the first most recent emitted estimate of active clients, the second most recent emitted estimate of active clients, and the third most recent emitted estimate of active clients.

In response to determining that the estimates satisfy the maximum active client threshold for the duration threshold (e.g., each of the estimates, an average of the estimates, the median of the estimates, or some other metric based on the estimates, is equal to or greater than the maximum active client threshold, and the estimates correspond to windows that at least collectively span a period of time that is equal to or greater than the duration threshold), server computer 120 allocates additional computing resources, such as additional server computers, to server computer system 110 through the elastic cloud computing system's API to support additional active client computers. Based on the new total number of computing resources allocated to server computer system 110, server computer 120 may determine a new maximum active client threshold and update the maximum active client threshold. If, in the current example, a new server computer is estimated to support up to 300 new active clients streaming video, then after the new server computer is allocated to server computer system 110, server computer 120 updates the maximum active client threshold to 1,300 and the minimum active client threshold to 1,100.

If server computer 120 determines the estimates satisfy the minimum active client threshold for a duration threshold (e.g., each of the estimates, an average of the estimates, the median of the estimates, or some other metric based on the estimates, is equal to or below the minimum active client threshold for a period of time that is equal to or greater than the duration threshold), then server computer 120 deallocates one or more computing resources, such as server computer 130 or server computer 140, from server computer system 110. In response to deallocating resources to server computer system 110, server computer 120 lowers the minimum active client threshold or maximum active client threshold accordingly.

A server computer system may take one or more other actions. For example, if an emitted estimate is greater than a maximum active client threshold, then the server computer system pushes an alert to a device operated by an administrator that includes the estimated number of active clients or indicates that the estimate is over the threshold. Additionally or alternatively, in response to emitting an active client estimate, server computer system 110 cause one or more clients to change their behavior. For example, and as discussed further herein, server computer system 110 may adjust the frequency of heartbeat messages sent by one or more clients based on one or more estimated number of estimated number of active clients over one or more windows.

Adjusting Heartbeat Frequency Based on Server Computer System Resources or Expected Error Returning to FIG. 2, in step 250, the server computer system determines a frequency at which one or more client computers should send heartbeat messages. The frequency at which a client computer sends heartbeat messages is referred to herein as a heartbeat frequency. For purposes of illustrating clear examples herein, a heartbeat frequency is discussed as a rate that indicates how often a client should send a heartbeat message for a given period of time, such as once message per second, or 120 times per minute. Accordingly, a client will send more heartbeat messages over a particular amount of time when the heartbeat frequency is increased and fewer heartbeat messages over the same amount of time when the heartbeat frequency is decreased. However, in an embodiment, a heartbeat frequency may indicate a how much time should pass between sending heartbeat messages, such as 100 milliseconds or two seconds. Accordingly, a client will send more heartbeat messages over a particular amount of time when the heartbeat frequency is decreased and fewer heartbeat messages over the same amount of time when the heartbeat frequency is increased.

The server computer system may autonomously cause one or more client computers to change their heartbeat frequency based on one or more factors, such as available computing power, available bandwidth, expected error (discussed further herein), or one or more other factors discussed herein. For purposes of illustrating a clear example, assume a heartbeat frequency value indicates the frequency at which clients should sent heartbeat messages to server computer system 110 and server computer 120 monitors the available bandwidth of server computer system 110. If server computer 120 determines the available bandwidth is below a threshold for a particular duration, then server computer 120 adjusts the heartbeat frequency value stored in storage 150 to decrease the frequency at which clients send heartbeat messages.

The heartbeat frequency may change based on input from an administrator. For example, if the load on one or more computers in server computer system 110 is above a particular threshold, then an administrator may adjust a heartbeat frequency value stored in storage 150 to increase the frequency at which clients should send heartbeats. An administrator may adjust the frequency for one or more other reasons, such as available bandwidth or expected error.

In step 260, the server computer system sends the frequency to one or more client computers. For example, in response to receiving a heartbeat message from client computer 190, server computer 120 may send the heartbeat frequency value stored on storage 150 to client computer 190. Accordingly, clients that receive the new heartbeat frequency value will begin sending heartbeat messages according to the heartbeat frequency value. The heartbeat frequency value may be sent to a client in response to a heartbeat message or one or more other requests for data. Additionally or alternatively, a client may send server computer system 110 a request for a heartbeat frequency, and in response, server computer system 110 sends the heartbeat frequency value to the client computer.

Distributed Server Computer System

Heartbeat messages may be received and processed by a plurality of server computers in a server computer system. For example, server computer 120, server computer 130, and server computer 140 may each receive a plurality of heartbeat messages from clients over a particular window of time. Server computer 120 computes a first partial total delta value, server computer 130 computes a second partial total delta value, and server computer 140 computes a third partial total delta value. Server computer 120, server computer 130, and server computer 140 may send the partial total delta values to a master computer defined by data in storage 150. For purposes of illustrating a clear example, assume server computer 120 is the master computer. Server computer 120 computes a combined total delta value for the window by summing each of the partial delta values received for the window. Server computer 120 estimates the number of clients actively coupled to server computer system 110 by dividing the combined total delta value by the span of the window.

A server computer system may estimate the number of clients actively coupled to the server computer system without regard to which server computer received or processed each heartbeat message. Accordingly, clients may choose which server computer to send each heartbeat message using a local choice algorithm or a load balancer. For example, in response to sending a first heartbeat message, server computer 120 may send, and client computer 180 may receive, a list of available server computers to send heartbeat messages to in server computer system 110. Client computer 180 may send heartbeat messages to each of the server computers in the list according to a uniform distribution or round-robin method. Additionally or alternatively, a server-side load balancer may determine which server computer receives or processes each heartbeat message.

Scaling

In an embodiment, clients may send too many heartbeat messages for a single server computer to receive and process quickly. Whether a heartbeat message is processed quickly can be based on one or more metrics. In an embodiment, a heartbeat message is processed quickly if the server computer that receives the heartbeat message and adds the delta value associated with the heartbeat message to a total delta value, partial total delta value, sub-total delta value (discussed further herein), or attributed total delta value (discussed further herein) within the same window.

Server computer system 110 may determine whether heartbeat messages are being processed quickly. For example, storage 150 may include a minimum processing threshold that indicates the percentage of heartbeats that should be processed quickly in each window for a duration threshold. Server computer system 110 can determine what percentage of heartbeat messages are being processed quickly by server computer system 110. If the percentage is less than the minimum process threshold for an amount of time greater than the duration threshold, then an administrator may apply additional computational resources, such as additional server computers, to server computer system 110. Additionally or alternatively, server computer system 110 may be configured to autonomously add additional server computers. For example, if server computer system 110 is part of an elastic computer system, then server computer 120 may request additional server computers from the elastic computer system through an API. Additionally or alternatively, the administrator may decrease the frequency at which clients should send heartbeat messages. If a server computer is not processing heartbeat messages quickly, then the server computer system may be referred to as overloaded.

Server computer system 110 may determine whether excess computational resources are allocated to processing heartbeats. For purposes of illustrating a clear example, assume storage 150 includes a satisfactory processing threshold that indicates the percentage of heartbeats that need not be processed quickly in each window for a duration threshold. Server computer 120 determines what percentage of heartbeat messages are being processed quickly by server computer system 110. If the percentage is greater than the satisfactory processing threshold for an amount of time greater than the duration threshold, then an administrator may deallocate computational resources, such as one or more server computers, to server computer system 110. Additionally or alternatively, server computer system 110 may be configured to autonomously deallocate computational resources. For example, if server computer system 110 is part of an elastic computer system, then server computer 120 may request that server computer 130 be deallocated or released from server computer system 110 into the elastic computer system through an API. Additionally or alternatively, the administrator may increase the frequency at which clients should send heartbeat messages.

Expected Error

A server computer system can calculate an expected error. For example, assume the following:

The time at which each client sends heartbeat messages with respect to a window boundary is uniformly distributed, i.e., for each heartbeat message at time $t_0$ if the current window started at time $t_w$, then $t_0-t_w$ is uniformly distributed between zero and the length of the window w. This is true for embodiments where there are no events causing multiple clients to send heartbeats at the same time. For example, assume users using a plurality of video playing devices independently select one or more videos to download and watch at different times of during the day from a video streaming service. If each client begins sending heartbeat messages according to a heartbeat frequency when the user using the client selects a video to stream from a server computer system, then the times at which each client sends a heartbeat message, and the times the server computer system receives the heartbeat messages from the clients, will be uniformly distributed.

The number of active clients is large with respect to the Law of Large Numbers.

The same clients are active throughout an entire window.

Under the forgoing, the expected value, or mean, of C, denoted as E[C], is equal to n, where n is the total number of active clients. The standard deviation of C, denoted as $\sigma(C)$, can be computed using the following equation:

$$\sigma(C) = \frac{T}{2w\sqrt{n}}.$$

In the equation above, w is the size of a window in seconds; T is the quadratic mean of the frequency at which each client is sending heartbeat messages, i.e., the square root of the mean of the squared length of the heartbeat frequency.

By the law of large numbers, the C is normally distributed with the above mean, E(C), and standard deviation, σ(C). Accordingly, C, the estimate of the number of clients is unbiased. As clients increase the frequency at which heartbeat messages are sent (i.e., reduce the amount of time between sending heartbeat messages), the error in the estimate C is reduced. Furthermore, as the server computer system increases the length of w, the error in the estimate C is reduced. If the number of clients actively coupled to a server computer system changes during a window, then the expected value of the estimate C is the average number of clients during the window, and the standard deviation σ(C) is bounded by the standard deviation at the time within the window at which the fewest clients are actively coupled to the server computer system.

Given a fixed T for near real-time estimates on the number of clients actively coupled to the server computer system, an administrator for the server computer system may pick a w small enough so that few clients become active or inactive within the same window, but large compared to T to reduce the error. In an embodiment, an administrator of the server computer system may select a value of w close to the geometric mean of T and the expected length of each client's active state.

Modify Capacity or Behavior Based on Expected Error

Using the equations discussed above, an administrator may select a heartbeat frequency and a window length; in response, the server computer system may determine the expected error based on the heartbeat frequency and the window length. Accordingly, an administrator may select a target expected error value and a window length; in response, the server computer system may determine the required heartbeat frequency at which the expected error matches the target expected error given the window length set by the administrator. Additionally or alternatively, an administrator may select a target expected error value and a heartbeat frequency; in response, the server computer system may determine the required window length at which the expected error matches the target expected error given the heartbeat frequency set by the administrator.

A server computer system may modify the heartbeat frequency or the length of a window based on a target expected error. For purposes of illustrating a clear example, assume server computer 120 determines that server computer system 110 is overloaded. In response, server computer 120 may decrease the heartbeat frequency as discussed herein, which reduces the load on server computer system 110. Server computer 120 determines a new window length based on the new heartbeat frequency to maintain the target expected error. In an embodiment, the heartbeat frequency is reduced and the window length is recalculated in response to determining that additional computer resources are not available due to cost, availability, or one or more other reasons.

In an embodiment, the window length may be adjusted in response to input from an administrator. If the window length is adjusted, then the server computer system may adjust the heartbeat frequency accordingly. For example, in response to receiving input from an administrator to reduce the window length to a new window length, server computer 120 calculates a new heartbeat frequency based on the target expected error and the new window length. However, increasing the heartbeat frequency increases the load on the server computer system. Accordingly, in response to adjusting the heartbeat frequency, a server computer may determine whether computer resources should be allocated or deallocated. For example, if server computer 120 determines that the load on the server computer system from the new heartbeat frequency would overload server computer system 110, or that server computer system 110 is already overloaded, then server computer 120 may allocate one or more computer resources to server computer system 110 accordingly. In response to reducing a heartbeat frequency or determining that server computer system 110 is not overloaded, server computer 120 may deallocate one or more computing resources from server computer system 110 accordingly.

Sub-Windows and Rolling Windows

Using one or more of the methods discussed above, a server computer system may estimate and emit the number of clients connected to the server computer system at the end of every window. For real-time estimates shorter than the span of a window, a server computer system may use sub-windows and rolling windows.

A sub-window is shorter than a single window. Each sub-window in a series of sub-windows spans an equal amount of time. Each sub-window is associated with a subtotal delta value. To compute the total delta value for a window, a server computer system adds the subtotal delta values associated with each sub-window within the span of the window.

A rolling window is a period of time that spans the length of a full window; however, a first rolling window can end after a second window begins. A server computer system can estimate and emit the number of clients actively coupled to the server computer system at the end of each rolling window. Accordingly, a server computer system can emit an estimate in real-time: more than one time over the duration or span of a single window.

Figure 3:
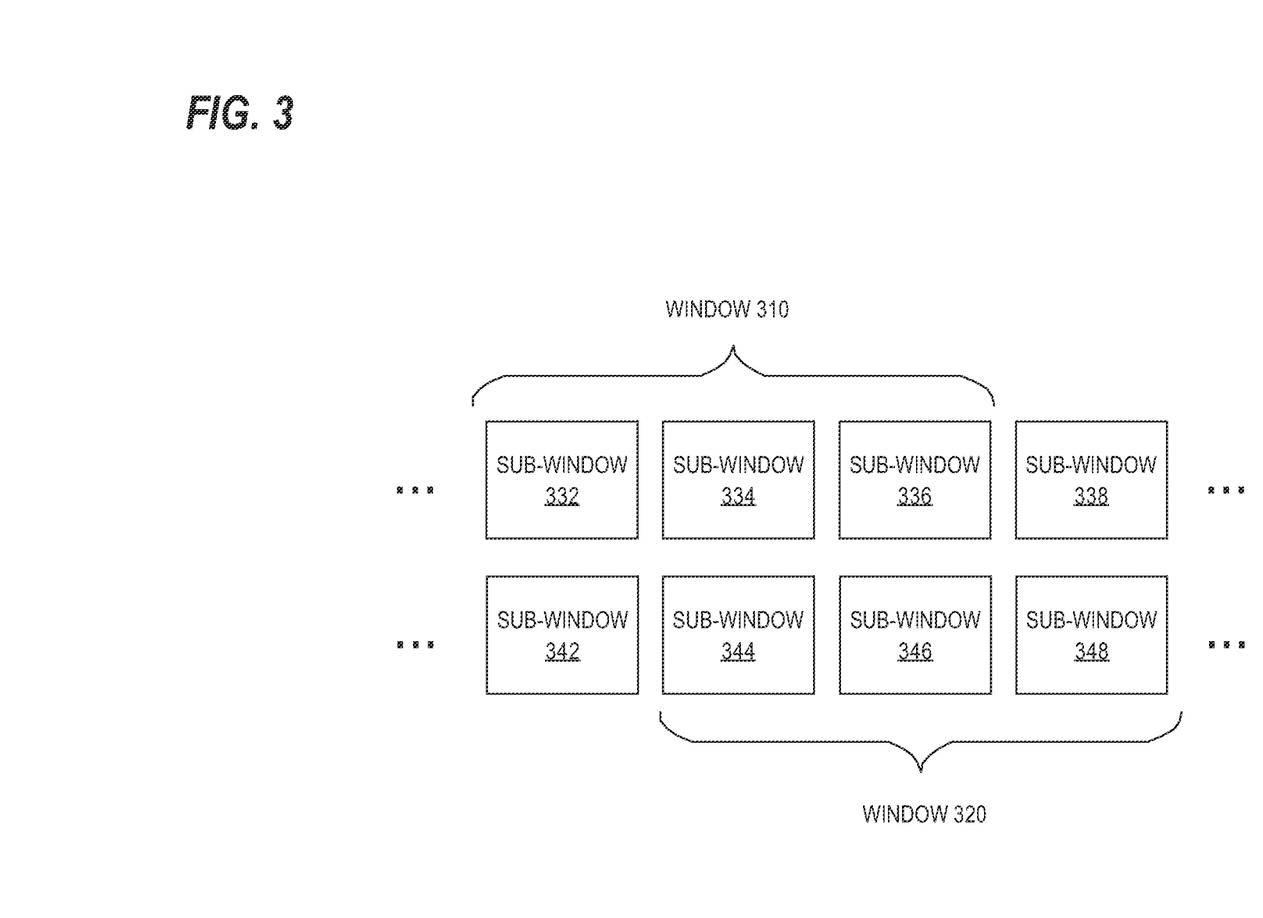
FIG. 3 is a block diagram of a plurality of sub-windows across multiple rolling windows in a server computer system with more than one server computer in an example embodiment.

FIG. 3 is a block diagram of a plurality of sub-windows across multiple rolling windows in a server computer system with more than one server computer in an example embodiment. In FIG. 3, window 310 and window 320 are rolling windows that each span one or more of the same sub-windows. For purposes of illustrating a clear example, assume the following:

Sub-window 332, sub-window 334, sub-window 336, and sub-window 338 are each sub-windows associated with a subtotal generated by server computer 120 from the delta values associated with the heartbeat messages received or processed by server computer 120 during the sub-window.

Sub-window 342, sub-window 344, sub-window 346, and sub-window 348 are each sub-windows associated with a subtotal generated by server computer 130 from the delta values associated with the heartbeat messages received or processed by server computer 130 during the sub-window;

Server computer 120 is the master computer for estimating the number of clients actively coupled to server computer system 110 during each rolling window, and accordingly, server computer 130 sends each of the sub-window produced by server computer 130 to server computer 120.

Server computer 120 estimates and emits the total number of clients coupled to server computer system 110 for rolling window 310 by summing the subtotal delta values associated with each of the following sub-windows:

Sub-window 332, sub-window 334, and sub-window 336, which were generated by server computer 120; and Sub-window 342, sub-window 344, and sub-window 346, which were each generated by server computer 130 and sent to server computer 120.

Server computer 120 estimates and emits the total number of clients coupled to server computer system 110 for rolling window 320 by summing the subtotal delta values associated with each of the following sub-windows:

Sub-window 334, sub-window 336, and sub-window 338, which were generated by server computer 120;

Sub-window 344, sub-window 346, and sub-window 348, which were each generated by server computer 130 and sent to server computer 120.

Accordingly, server computer system 110 can emit a new estimate of the number of active clients at the end of each sub-window. Server computer system 110 may, but need not, retain the sub-windows in memory that are older than a full window. For example, after sub-window 332 and sub-window 342 are no longer within the span of a rolling sub-window, of which an estimated total number of active clients has been emitted, server computer 120 may delete, deallocate, or overwrite sub-window 332 and sub-window 342 in memory.

Keyed Counts

As discussed herein, a heartbeat message may include additional data to classify the heartbeat message into one or more groups. For example, a heartbeat message may include two attributes: a first attribute that identifies a geographic region from which the client is sending the heartbeat message, and a second attribute that indicates the type of client computer that is sending the heartbeat message.

A server computer system may generate a total delta value or an estimated number of active clients for each classification or attribute for each window. The total delta values may be stored in a hash table associated with each window. For example, for each heartbeat message of a plurality of heartbeat messages, when server computer 120 receives or processes the heartbeat message, for each attribute in the heartbeat message: server computer 120 determines whether an entry in the hash table includes a hash key that corresponds to the attribute; if no such entry is in the hash table, then server computer 120 generates a new entry in the hash table that includes the hash key and a total delta value that is equal to the delta value in the message; otherwise, server computer 120 adds the delta value in the message to the total delta value for the entry that includes the hash key. After the window closes, server computer 120 estimates the number of active clients for each attribute. For example, for each entry in the hash table, server computer 120 divides the total delta value for the entry by the span of the window, and stores the estimated number of active clients in the entry.

For purposes of illustrating a clear example, assume the following:

Server computer 120 receives or processes a first heartbeat message in a first window with a delta value set to one and the following attribute labels: "mobile device" and "CA";

Server computer 120 receives or processes a second heartbeat message in the first window with a delta value set to one and the following attribute labels: "mobile device" and "NY";

Server computer 120 maintains a hash table associated with the first window.

When server computer 120 processes the first heartbeat message, server computer 120 generates a first entry and a second entry in the hash table associated with the first window that correspond to the two attributes included in the first heartbeat message: "mobile device" and "CA", respectively. Server computer 120 sets the total delta value for each entry to the delta value in the first heartbeat message, which in this example is one. Accordingly, the entries in the hash table after server computer 120 processes the first heartbeat are <"mobile device", 1> and <"CA", 1>, wherein, for each entry, the first value is the hash key and the second value is the total delta value. Additionally, server computer 120 may add the delta value from the first heartbeat message to a total delta value associated with the first window. Accordingly, after the first heartbeat message is processed, the total delta value associated with the first window is one.

When server computer 120 processes the second heartbeat message, server computer 120 determines that the first entry has a hash key that corresponds to "mobile device", but not "NY". In response, server computer 120 adds the delta value for the second heartbeat message to the total delta value associated with the first entry, and generates a third entry in the hash table that corresponds to the attribute "NY" and sets the total delta value that corresponds to the third entry in the hash table to one. Accordingly, the entries in the hash table after server computer 120 processes the second heartbeat message are <"mobile device", 2>, <"CA", 1>, and <"NY", 1>. Additionally, server computer 120 may add the delta value from the second heartbeat message to the total delta value associated with the first window. Accordingly, after the second heartbeat message is processed, the total delta value associated with the first window is two.

Server computer system 110 may continue to update the hash table for each heartbeat message received during the first window. At the end of the first window, server computer 120 generates the estimated number of active clients for each entry in the hash table. For example, for each entry in the hash table, server computer 120 divides the total delta associated with the entry by the amount of time the first window spans, and stores the result in the entry. Assume that in this example the span of the first window is two seconds. Accordingly, after server computer 120 generates the estimate number of active clients for each entry, the entries in the hash table are <"mobile device", 2, 1>, <"CA", 1, 0.5>, and <"NY", 1, 0.5>, wherein, for each entry, the first value is the hash key, the second value is the total delta time, and the third value is the estimated number of active clients. Additionally or alternatively, server computer 120 generates a new hash table to store the number of active clients associated with each hash key. Accordingly, for each entry in the previous hash table, server computer 120 generates a new entry in the new hash table that includes the same hash key and the estimated number of active clients. Additionally, server computer 120 divides the total delta value associated with the first window by the span of the first window. Accordingly, the estimated number of active clients associated with the first window is one.

Server computer 120 may emit the window with a total delta value, the hash table for the window, or data from the hash table for the window as discussed above. For example, server computer 120 may store the hash table or the estimated number of active clients for each classification/attribute in storage 150. An administrator, using a client computer, may query storage 150 for the hash tables associated with each window over a particular period of time to generate one or more reports about where clients are from or what types of devices clients are using.

In an embodiment, the total delta value or total number of active clients associated with each entry in a hash table may be a 64-bit unsigned integer. Using a hash table or 64-bit unsigned integers is one a way to implement the features discussed above. Additionally or alternatively, one or more other types of data or data structures may be used.

Lazy Instantiation of Hash Tables and Entries

Server computer system 110 may generate a new hash table at the beginning of each window, or a server computer system may lazily generate hash tables and entries. For purposes of illustrating a clear example, assume the following:
 Server computer 120 receives or processes a third heartbeat message during a second window that does not include any attributes;
 Subsequently, server computer 120 receives a fourth heartbeat message during the second window that does include one or more attributes.

In response to receiving or processing the third heartbeat message, server computer 120 may add the delta value associated with the third heartbeat message to a total delta value associated with the second window. Server computer 120 need not generate a hash table for the second window or any entries that correspond to any classifications/attributes. In response to receiving the fourth heartbeat message, which includes one or more attributes, server computer 120 determines that no hash table is associated with the second window yet, and generates the hash table, and one or more entries that correspond with the one or more attributes in the fourth heartbeat message as discussed herein.

Keyed Counts Over Rolling Windows and Distributed Systems

The features discussed in this section may be used for rolling windows and sub-windows. For example, a subtotal hash table may be created for, and associated with, each sub-window. When server computer system 110 generates or emits a rolling window, then server computer system 110 may generate an aggregated hash table. Each entry in the aggregated hash table corresponds to one or more entries in one or more subtotal hash tables that are associated with one or more sub-windows in the rolling window. Each aggregated total delta value associated with an entry in the aggregated hash table is the sum of the one or more subtotal delta values associated with the one or more corresponding entries in the one or more subtotal hash tables associated with the one or more sub-windows in the rolling window. For each entry in the aggregated hash table, server computer system 110 computes an aggregated estimated number of active clients for the entry by dividing the aggregated total delta value associated with the entry by the span of the rolling window. The aggregated estimated number of active clients may be associated with the entries in the aggregated hash table or a new hash table as discussed herein.

The features discussed in this section may be used for partial windows. For example, a partial hash table may be created for, and associated with, each partial window generated on a server computer in server computer system 110. Server computer system 110 may generate an aggregated hash table. Each entry in the aggregated hash table corresponds to one or more entries in one or more subtotal hash tables that are associated with one or more partial windows in the window. Each aggregated total delta value associated with an entry in the aggregated hash table is the sum of the one or more partial total delta values associated with the one or more corresponding entries in the one or more subtotal hash tables associated with the one or more partial windows in the window. For each entry in the aggregated hash table, server computer system 110 computes an aggregated estimated number of active clients for the entry by dividing the aggregated total delta value associated with the entry by the span of the rolling window. The aggregated estimated numbers of active clients may be associated with the entries in the aggregated hash table or a new hash table as discussed herein.

For purposes of illustrating a clear example of using one or more of the features discuss herein for partial windows and sub-windows, assume the following:
 Server computer 120 generates a first partial window with a first subtotal hash table; the first subtotal hash table has two entries: <"mobile computer", 2.2> and <"NYC", 2>.
 Server computer 130 generates a second partial window with a second subtotal hash table; the second partial window corresponds to the same time as the first partial window; the second subtotal hash table has one entry: <"mobile computer", 2>.
 Server computer 120 generates a third partial window with a third subtotal hash table; the third subtotal hash table has one entry: <"desktop computer", 1>.
 Server computer 130 generates a fourth partial window with a fourth subtotal hash table; the fourth partial window corresponds to the same time as the third partial window; the fourth subtotal hash table has one entry: <"mobile computer", 2>.
 The span of a rolling window is two seconds opening at a particular beginning time and closing a particular ending time.
 The first partial window, the second partial window, the third partial window, and the fourth partial window are within the span of the rolling window.
 The span of each sub-window is one second, and the unit of time for each delta time, total delta time, or subtotal delta time is in seconds.
 Server computer 120 is the master server computer and receives the second partial window and the fourth partial window from server computer 130 after server computer 130 determines that the second partial window has closed and the fourth partial window has closed, respectively.

Server computer 120 generates an aggregate hash table for the rolling window based on the subtotal hash tables from each of the four windows. Specifically, server computer 120 generates three entries in the aggregate hash table: <"mobile computer", 6.2>, <"NYC", 2>, and <"desktop computer", 1>. For each entry in the aggregate hash table, server computer 120 divides the aggregate total delta value by the amount of time that the rolling window spans to produce an aggregate estimated number of active clients. In this example, server computer 120 generates a new hash table with entries for each of the aggregate estimated number of active clients, referred to as an aggregate estimated number of active clients hash table, which includes the following entries: <"mobile computer", 3.1>, <"NYC", 1>, and <"desktop computer", 0.5>, wherein, for each entry, the first value is the hash key for a corresponding classification/attribute and the second value is the aggregate estimated number of clients for the corresponding classification/attribute. As discussed herein, server computer 120 may emit the rolling window, the aggregate estimated number of active clients hash table, or data associated the rolling window or the aggregate estimated number of active clients hash table, such as the aggregate estimated total number of active clients overall and the aggregate estimated number of active clients using mobile computers.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
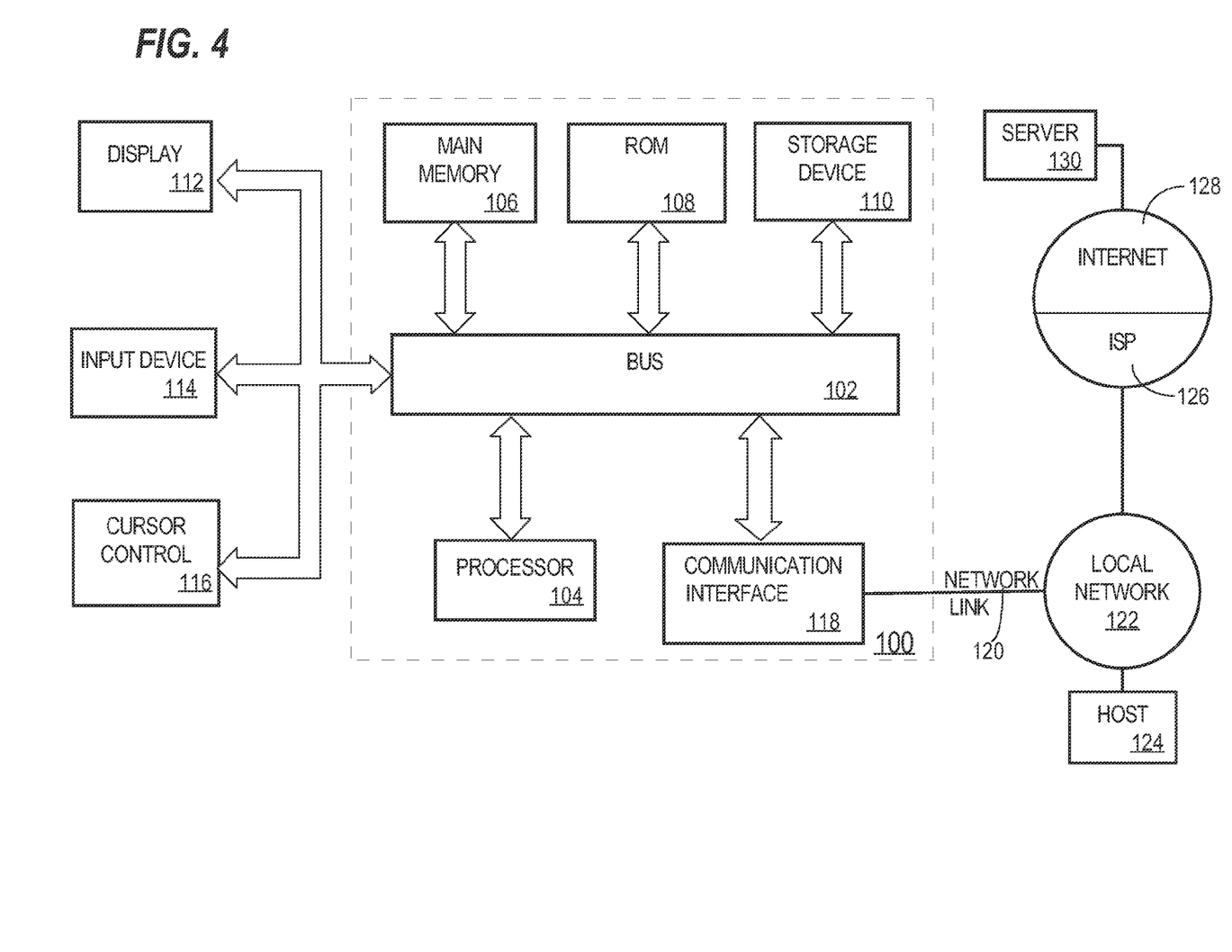
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A system comprising:
a memory;
one or more processors coupled to the memory and configured to:
  receive, from a plurality of client computers, a first plurality of heartbeat messages;
  wherein each heartbeat message of the first plurality of heartbeat messages:
    is sent by a client computer of the plurality of client computers, and
    includes a delta value that indicates an amount of time that has elapsed since a previous heartbeat message sent from the client computer;
  wherein each heartbeat message in a first subset of heartbeat messages of the first plurality of heartbeat messages includes a first attribute;
  wherein each heartbeat message in a second subset of heartbeat messages of the first plurality of heartbeat messages includes a second attribute;
  determine a first subtotal based, at least in part, on the delta value in each heartbeat message of the first subset of heartbeat messages;
  determine a second subtotal based, at least in part, on the delta value in each heartbeat message of the second subset of heartbeat messages;
  receive a first query that identifies the first attribute, and in response, determine a first total number of active client computers based, at least in part, on the first subtotal and a defined amount of time in a first window, but not the second subtotal; and
  receive a second query that identifies the second attribute, and in response, determine a second total number of active client computers based, at least in part, on the second subtotal and the defined amount of time in the first window, but not the first subtotal.

2. The system of claim 1, wherein each heartbeat message of the one or more heartbeat messages does not include a client identifier.

3. The system of claim 1, wherein:
a first heartbeat message of the first plurality of heartbeat messages includes a first delta value;
a second heartbeat message of the first plurality of heartbeat messages includes a second delta value that is different than the first delta value.

4. The system of claim 1, wherein the delta value in a first heartbeat message of the first plurality of heartbeat messages is different than the delta value in a second heartbeat message of the first plurality of heartbeat messages.

5. The system of claim 1, wherein:
the one or more processors are further configured to:
receive a third query that identifies the first attribute and the second attribute, and in response, determine a third total number of active client computers based, at least in part, on the first subtotal, the second subtotal, and the defined amount of time in the first window.

6. The system of claim 1, wherein the one or more processors are further configured to:
send, to one or more first client computers of the plurality of client computers, a first frequency;
receive, from the one or more first client computers, a second plurality of heartbeat messages according to the first frequency.

7. The system of claim 6, wherein the one or more processors are further configured to:
determine a second frequency based, at least in part, on one or more factors, wherein the second frequency is different than the first frequency;
send, to one or more second client computers of the plurality of client computers, the second frequency;
receive, from the one or more second client computers, a second plurality of heartbeat messages according to the second frequency.

8. The system of claim 6, wherein the one or more processors are further configured to:
determine a load on one or more server computers;
determine the load exceeds a threshold, and in response:
  send, to one or more second client computers of the plurality of client computers, a second frequency that is less than the first frequency based on one or more factors; and
  receive, from the one or more second client computers, a second plurality of heartbeat messages according to the second frequency.

9. The system of claim 1 comprising a plurality of server computers that comprise the one or more processors and the memory, wherein:
the first plurality of heartbeat messages are collectively received by the plurality of server computers;

each server computer of the plurality of server computers is configured to:
    determine a subtotal amount of time based, at least in part, on the delta value from each heartbeat message received by the server computer;
    send the subtotal amount of time to a particular server computer;
    the particular server computer is configured to determine a first total amount of time based, at least in part, on the subtotal amount of time received from each server computer of the plurality of server computers.

10. The system of claim 1, wherein the one or more processors are further configured to:
for each sub-window of a plurality of sub-windows:
    receive a plurality of heartbeat messages during the sub-window;
    determine a subtotal amount of time based, at least in part, on the delta value from each heartbeat message of the plurality of heartbeat messages received during the sub-window;
    determine the first window comprises a first set of sub-windows of the plurality of sub-windows;
    determine a first total amount of time based, at least in part, on the subtotal amount of time of each sub-window in the first set of sub-windows;
    determine a total number of active client computers based, at least in part, on the first total amount of time and the defined amount of time in the first window;
    wherein the total number of active client computers is a first total number of active client computers;
    determine a second window comprises a second set of sub-windows of the plurality of sub-windows;
    determine a second total amount of time based, at least in part, on the subtotal amount of time of each sub-window in the second set of sub-windows;
    determine a second total number of active client computers based, at least in part, on the second total amount of time and a defined amount of time in the second window.

11. The system of claim 10, wherein:
the first window comprises a first sub-window of the plurality the plurality of sub-windows and a second sub-window of the plurality the plurality of sub-windows, but not a third sub-window of the plurality the plurality of sub-windows;
the second window comprises the second sub-window of the plurality the plurality of sub-windows and the third sub-window of the plurality the plurality of sub-windows, but not the first sub-window of the plurality the plurality of sub-window.

12. A method comprising:
receiving, from a plurality of client computers, a first plurality of heartbeat messages;
wherein each heartbeat message of the first plurality of heartbeat messages:
    is sent by a client computer of the plurality of client computers, and
    includes a delta value that indicates an amount of time that has elapsed since a previous heartbeat message sent from the client computer;
wherein each heartbeat message in a first subset of heartbeat messages of the first plurality of heartbeat messages includes a first attribute;
wherein each heartbeat message in a second subset of heartbeat messages of the first plurality of heartbeat messages includes a second attribute;
determining a first subtotal based, at least in part, on the delta value in each heartbeat message of the first subset of heartbeat messages;
determining a second subtotal based, at least in part, on the delta value in each heartbeat message of the second subset of heartbeat messages;
receiving a first query that identifies the first attribute, and in response, determine a first total number of active client computers based, at least in part, on the first subtotal and a defined amount of time in a first window, but not the second subtotal; and
receiving a second query that identifies the second attribute, and in response, determine a second total number of active client computers based, at least in part, on the second subtotal and the defined amount of time in the first window, but not the first subtotal;
wherein the method is performed by one or more processors.

13. The method of claim 12, wherein the delta value in a first heartbeat message of the first plurality of heartbeat messages is different than the delta value in a second heartbeat message of the first plurality of heartbeat messages.

14. The method of claim 12, wherein each heartbeat message of the one or more heartbeat messages does not include a client identifier.

15. The method of claim 12, wherein:
a first heartbeat message of the first plurality of heartbeat messages includes a first delta value;
a second heartbeat message of the first plurality of heartbeat messages includes a second delta value that is different than the first delta value.

16. The method of claim 12 comprising:
for each sub-window of a plurality of sub-windows:
    receiving a plurality of heartbeat messages during the sub-window;
    determining a subtotal amount of time based, at least in part, on the delta value from each heartbeat message of the plurality of heartbeat messages received during the sub-window;
    determining the first window comprises a first set of sub-windows of the plurality of sub-windows;
    determining a first total amount of time based, at least in part, on the subtotal amount of time of each sub-window in the first set of sub-windows;
    wherein the total number of active client computers is a first total number of active client computers;
    determining a total number of active client computers based, at least in part, on the first total amount of time and the defined amount of time in the first window;
    determining a second window comprises a second set of sub-windows of the plurality of sub-windows;
    determining a second total amount of time based, at least in part, on the subtotal amount of time of each sub-window in the second set of sub-windows;
    determining a second total number of active client computers based, at least in part, on the second total amount of time and a defined amount of time in the second window.

17. The method of claim 12 further comprising:
receiving a third query that identifies the first attribute and the second attribute, and in response, determining a third total number of active client computers based, at least in part, on the first subtotal, the second subtotal, and the defined amount of time in the first window.

18. The method of claim 12 further comprising:
sending, to one or more first client computers of the plurality of client computers, a first frequency;
receiving, from the one or more first client computers, a second plurality of heartbeat messages according to the first frequency.

19. The method of claim 18 further comprising:
determining a second frequency based, at least in part, on one or more factors, wherein the second frequency is different than the first frequency;
sending, to one or more second client computers of the plurality of client computers, the second frequency;
receiving, from the one or more second client computers, a second plurality of heartbeat messages according to the second frequency.

20. The method of claim 18 further comprising:
determining a load on one or more server computers;
determining the load exceeds a threshold, and in response:
sending, to one or more second client computers of the plurality of client computers, a second frequency that is less than the first frequency based on one or more factors; and
receiving, from the one or more second client computers, a second plurality of heartbeat messages according to the second frequency.

21. The method of claim 12, wherein the first plurality of heartbeat messages are collectively received by a plurality of server computers, and the method further comprising:
each server computer of the plurality of server computers:
determining a subtotal amount of time based, at least in part, on the delta value from each heartbeat message received by the server computer;
sending the subtotal amount of time to a particular server computer;
wherein the particular server computer determines a first total amount of time based, at least in part, on the subtotal amount of time received from each server computer of the plurality of server computers.

22. The method of claim 16, wherein:
the first window comprises a first sub-window of the plurality the plurality of sub-windows and a second sub-window of the plurality the plurality of sub-windows, but not a third sub-window of the plurality the plurality of sub-windows;
the second window comprises the second sub-window of the plurality the plurality of sub-windows and the third sub-window of the plurality the plurality of sub-windows, but not the first sub-window of the plurality the plurality of sub-window.

\* \* \* \* \*